United States Patent [19]

Leenhouts

[11] 4,016,472
[45] Apr. 5, 1977

[54] NON-LINEAR VELOCITY CHANGE CIRCUIT FOR CONSECUTIVE LENGTH COMMANDED DIGITAL MOTOR MEANS

[75] Inventor: Albert C. Leenhouts, Harwinton, Conn.

[73] Assignee: The Superior Electric Company, Bristol, Conn.

[22] Filed: Jan. 17, 1975

[21] Appl. No.: 542,057

[52] U.S. Cl. .............................. 318/696; 318/601
[51] Int. Cl.² ...................................... G05B 79/40
[58] Field of Search .......... 318/685, 696, 138, 601, 318/607; 235/151.11

[56] References Cited

UNITED STATES PATENTS

| | | | |
|---|---|---|---|
| 3,553,549 | 1/1971 | Leenhouts | 318/696 |
| 3,579,279 | 5/1971 | Inaba et al. | 318/138 |
| 3,582,751 | 6/1971 | Rosshirt et al. | 318/696 |
| 3,899,729 | 8/1975 | Emery | 318/696 |

Primary Examiner—Robert K. Schaefer
Assistant Examiner—John J. Feldhaus
Attorney, Agent, or Firm—Ernest M. Junkins

[57] ABSTRACT

A circuit for varying the rate of velocity changes of a digital motor wherein the motor produces movement that is commanded by successive lengths with each length having an extent defined by a whole number of steps and in which each length by its extent sets its own velocity whereby non-linear velocity changes in accordance with motor speed are obtained from a command that includes just length extent information.

8 Claims, 3 Drawing Figures

NON-LINEAR VELOCITY CHANGE CIRCUIT FOR CONSECUTIVE LENGTH COMMANDED DIGITAL MOTOR MEANS

The present invention relates to a motion producing system having a digital motor means that produces a movement that is subdivided into a plurality of successive lengths. Each length has an extent defined by a whole number of steps that are to be produced at a constant rate and there are normally a plurality of different length extents. A command is provided for each length and represents the number of steps that its length is to have. An increase in the number of steps from one length to the next causes the motor velocity, i.e., steps per second, to increase and hence acceleration occurs while a decrease in steps between adjacent lengths causes motor deceleration. Either change thus constitutes a motor velocity change. One type of motion system based on lengths is disclosed in my copending application Ser. No. 524,965 filed Nov. 18, 1974 and assigned to the assignee of the present invention.

In such a system, the command for a length consists of information related to the whole number of steps in the length and as the time interval to produce each length's movement is maintained constant, the number of steps or length extents sets the velocity in steps per second of the motor as the velocity must equal the length extent divided by the time interval. By limiting the difference in the number of steps which may exist between adjacent lengths to a maximum value, then the maximum velocity change between adjacent lengths may thus be set to be within the motor's ability to respond. However, by limiting the information for the command for each length to just its number of steps, the system is thus limited to having the same maximum velocity change occur between adjacent lengths irrespective of the motor's velocity, and hence results in a system having a linear velocity change.

Normally, a motor is more fully utilized if its velocity changes are made to be non-linear by normally having less velocity change occur at higher motor speeds than at lower speeds, so that a linear velocity change system accordingly generally decreases the utilization of the motor's ability.

In U.S. Pat. No. 3,908,195 granted Sept. 23, 1975 entitled Digitally Determined Velocity Control Method and Means For A Digital Motor System, Ser. No. 433,844, filed Jan. 16, 1974 now U.S. Pat. No. 3,908,195 and assigned to the assignee of the present invention, there is disclosed a system that includes in the command for each length, information of its velocity rate. However, having to include the velocity rate is normally not desirable as it increases the information required for each command and first has to be determined, second, then stored or transferred and third, utilized in a system, all of which tends to increase the size and complexity of such a motion system.

It is accordingly an object of the present invention to provide a motion control system in which there are commands for consecutive lengths with each command only being for the number of steps in the length but in which non-linear velocity changes may be achieved even though the changes in extents between lengths is kept within a maximum difference.

Another object of the present invention is to achieve the above object with a system that includes a circuit that enables the number of steps in a length to select its own rate for its own steps and in which the relationship between length extents and velocity rates may be relatively easily changed thereby enabling the system to be adapted to different situations.

A further object of the present invention is to achieve the above objects with a circuit that may be easily incorporated into heretofore known motion control systems, which is relatively economical to manufacture and which is reliable in use.

In carrying out the present invention, the non-linear velocity change circuit is capable of being included into either of the systems disclosed in the above-noted applications, both of which accept commands representing the number of steps that each length is to have. The extent of each length is made to differ by no more than one step from the extent of the prior length though another maximum difference may be employed. In the mentioned U.S. Patent, the disclosed system accepts length commands having information of the velocity value and number of steps and uses a rate multiplier to produce motor steps by having the velocity value added to itself for each clock pulse. Each spillover count of the rate multiplier produces a motor pulse which is translated into a step by a digital motor means. A length is completed when the number of motor pulses equals the command extent. The clock pulses are obtained from an oscillator set to a constant rate and hence not supplied with each command. In the first mentioned application, the disclosed system uses a pulse rate generator to subdivide pulses obtained from a fixed rate oscillator to produce a plurality of different rates of motor pulses and the command for a length selects one of the rates to produce the number of steps which the length should have in a constant time interval. Thus, in both systems, the motor pulses are obtained by using an oscillator operating at a fixed rate for all lengths.

The above two systems are altered by the present invention to effect non-linear velocity changes by making each of the fixed rate oscillators, adjustable and by controlling the rates thereof for a length in accordance with the extent of the length. Thus, a digital to analog converter receives information of the number of steps in a length and utilizes this information to provide a voltage to the adjustable rate oscillator that sets a selected rate of the oscillator for each extent. Each extent produces a known oscillator rate and by selecting the relationship between extents and rates, the relationship between extents, velocity and velocity change is thus obtained.

The rates selected are preferably such that at low speeds, a few steps per length, there is a greater change in velocity for a one step difference between lengths than at the higher speeds so that as the motor speed increases the velocity change per one step difference will decrease, thereby providing different velocity changes for different speeds even though the same one step difference exists between adjacent lengths. Thus, in both embodiments the oscillator is normally made to operate at a higher pulse rate for the smaller extent lengths than for the larger extent lengths but at a lesser rate for the larger lengths than for the smaller lengths when compared to a linear velocity change oscillator.

As the number of steps per length increases and the rate of the oscillator is decreased, the same difference in steps between adjacent lengths will produce a smaller velocity change by increasing the duration of the time interval for the higher lengths. Thus a difference of one step between adjacent lengths is produced as a velocity change in a shorter time interval for the low speeds than a one step difference for the higher speeds. A shorter time period will produce a greater velocity change for the same one step difference than in a longer time period for the same one step difference and thus non-linear velocity changes are obtained by adjusting the rates of the oscillator in accordance with the extent of each length. The rates for different extents may be set for one operating situation but yet they may be easily adjusted to enable the system to be adapted to other different operating situations where different velocity changes are desired.

Other features and advantages will hereinafter appear.

Figure 1:
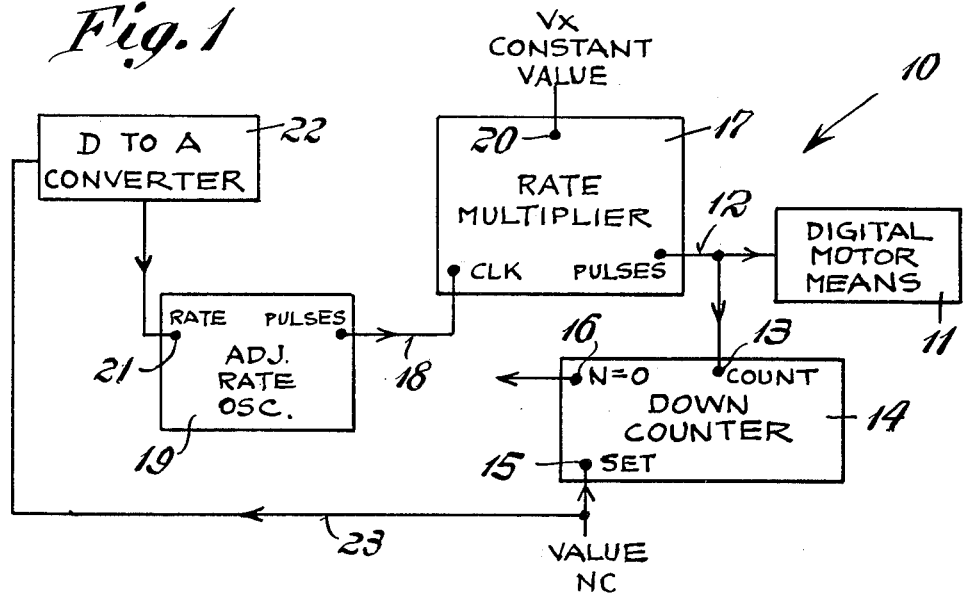
FIG. 1 is a block diagram of the non-linear velocity change circuit of the present invention incorporated into the motion control system disclosed in the second mentioned application.

Referring to the drawing, the system disclosed in FIG. 1 is generally indicated by the reference numeral 10 and includes a digital motor means 11 for producing an incremental movement for each pulse received on a line 12. The line 12 is also connected to a count terminal 13 of a down counter 14 which has a set terminal 15 which sets the down counter 14 to the value of NC with NC being the number of steps in each length and hence a command. An NO terminal 16 supplies a signal to produce a request for the next length command, the next value of NC, whenever the down counter has a zero count.

The system includes a rate multiplier 17 which receives clock pulses on a lead 18 from an adjustable rate oscillator 19 and also the electrical representation of a constant value of VX on a terminal 20.

As disclosed in the mentioned Patent, the value of VX is added to itself each time a clock pulse appears on lead 18 and each time the maximum count or spillover count of the multiplier 17 is achieved, a motor pulse appears on a lead 12. The motor pulses are counted by the down counter 14 and when the number of pulses have appeared that equals the extent (value of NC) of a length, a new command is made to be received which resets the down counter to the extent of the new length. Also, it would contain information of the new value of VX for the new length. The system would then repeat the process for each length.

This system is changed to incorporate the present invention to provide non-linear acceleration by having the value of VX remain constant thereby eliminating the need for having the value of VX supplied with each command and by making the clock oscillator 19 adjustable in rate, rather than being set at a fixed rate. The clock oscillator 19 has a rate terminal 21 which receives a voltage and alters the rate of the oscillator pulses or clock pulses in accordance with the value of the voltage supplied thereto. A digital to analog converter 22 is connected by a lead 23 to receive the electrical representation for the value of NC for a length to produce to the terminal 21 a voltage that is directly related to the value of NC and hence the rate at which the oscillator 19 is to produce clock pulses. The digital to analog converter maintains this voltage and hence the oscillator rate while the motor pulses for this length are being produced.

Figure 2:
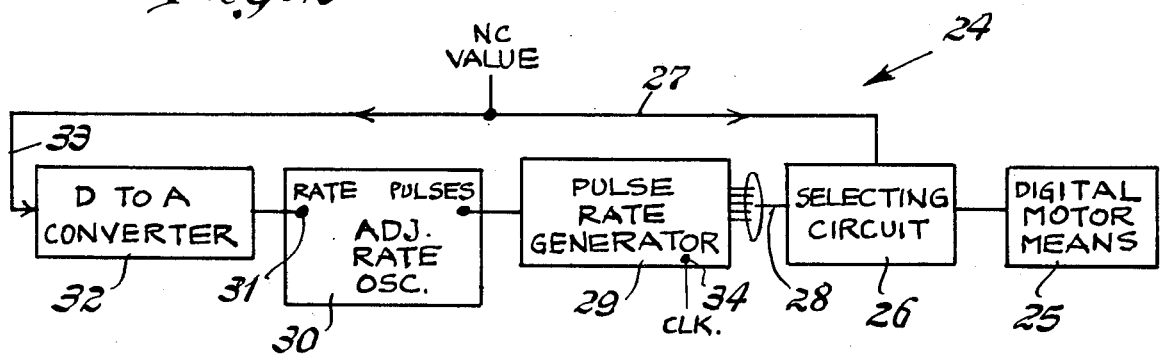
FIG. 2 is a block diagram of the present invention applied to the motion control system disclosed in the first mentioned application.

Referring to FIG. 2, the non-linear voltage change circuit is shown applied to the embodiment of the invention of a motion control disclosed in the first mentioned application. The system 24 includes a digital motor means 25 which receives pulses from a selecting circuit 26 that is connected to receive the electrical representation of the value of NC on a lead 27. The selecting circuit 26 also receives on a plural lead 28 a plurality of different pulse rates from a pulse rate generator 29 that is connected to an adjustable rate oscillator 30. The oscillator 30 includes a rate terminal 31 to which a voltage is applied from a digital to analog converter 32 that receives the electrical representation of the value of NC on a lead 33.

The selecting circuit 26 selects the rate from the pulse rate generator lead 28 which will produce in a time interval the whole number of steps commanded by the value of NC. The time interval is set by the generator 29 being in effect a spillover counter and producing a clock pulse on a lead 34 each time it counts to its maximum count with the time between clock pulses being the duration in which the commanded length is to be produced.

Figure 3:
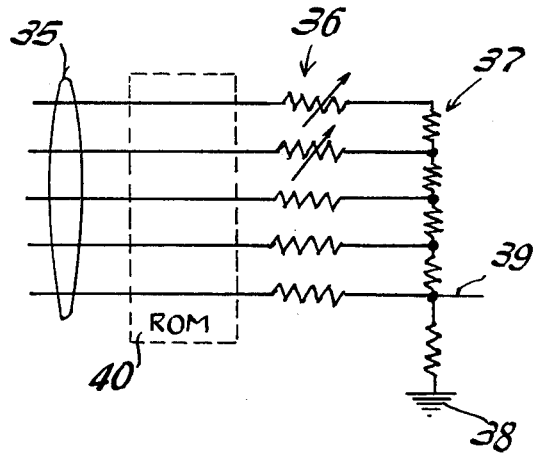
FIG. 3 is a block and schematic diagram of a digital to analog converter which may be employed to provide a voltage having a value dependent on the extents of the lengths.

One form of a digital analog converter is shown in FIG. 3 and may include a plural lead 35 corresponding to leads 23 or 33 on which the electrical representations of NC is supplied. A plurality of resistances 36 are provided, some, none or all of which may be adjustable with there being one resistance connected to each lead 35 and with the resistors being connected in parallel to a resistance network 37 that is grounded as at 38. The value of voltage that is related to the representation on the lead 35 is provided on the output lead 39 which is connected to the rate control terminal of either oscillator 19 or 30.

While the resistors 36 may be selected or adjusted for each operating condition or situation to produce the desired velocity changes, it is also contemplated that a programmed read only memory 40 may be used together with a number of fixed resistances so that by merely changing the memory's output for each electrical representation, a corresponding change can be obtained in the output voltage to facilitate altering the system to different velocity change situations.

Though one specific embodiment of a digital to analog converter has been specifically disclosed, other and different types may be employed if desired.

As an example of the circuit of the present invention shown in FIG. 2 providing different velocity change values for different motor speeds, the value of NC is assumed to be 1 and the oscillator frequency is made to be 6040 $H_z$. The pulse rate generator supplies a clock pulse on its terminal 34 for each 64 oscillator pulses and hence a time interval of 10.53 milliseconds is provided between clock pulses. The motor's velocity for this one step length is 95 steps per second. If the next length has a value of NC of 2, i.e., two steps in the length, the frequency of the oscillator 30 may be changed to 5760 $H_z$ which produces a time interval of 11.11 milliseconds for the length and a motor speed of 180 steps per second. The motor has had its velocity changed by an acceleration rate of 7650 steps per second squared when the length extent changed from 1 to 2 steps.

On the other hand, if NC has a value of 5 and causes the oscillator 30 to have a frequency of 4800 $H_z$, the time interval is 13.33 milliseconds for this length and the motor velocity is at a rate of 375 steps per second. If the next length has an NC value of 6, the converter 32 causes the oscillator 30 to operate at a rate of 4480 $H_z$, the time interval is 14.29 milliseconds for the length and the motor is stepped at a velocity of 420 steps per second. The acceleration rate for this change in motor velocity from 5 steps per length to 6 steps per length is 3150 steps per second squared. Thus, by changing the frequency of the oscillator, the time interval in which the commanded length is produced accordingly changes and even though a one step difference remains between adjacent lengths, the acceleration of the motor is different for the different extents of lengths or motor speeds.

In the embodiment shown in FIG. 1 the oscillator 19 rate increases to increase the number of steps per time interval but the rate increase becomes smaller for each one step difference as the number of steps in a length increases. Accordingly, the time interval over which the pulses on the lead 12 are produced for a command is increased with increasing extents and non-linear acceleration is thus obtained. It should be noted that the embodiment shown in FIG. 1 requires a much larger range of rate adjustability of the oscillator than the embodiment shown in FIG. 2 for the same motor velocities.

It will be understood that while it is preferred to use a voltage controlled oscillator for providing pulses at different rates, other adjustable pulse rate devices may be employed. One example could consist of a fixed rate oscillator whose pulses are divided by a spillover counter having a spillover count that varies with the value of NC and with the spillover pulses being the pulses employed in the system.

Accordingly, it will be understood that there has been disclosed a non-linear acceleration (or deceleration) velocity change circuit which may be easily incorporated into presently existing motion control circuits which receive the command of the whole number of steps a length is to produce for each command. The change between adjacent lengths, even though kept within a maximum difference of generally 1, is made to provide non-linear acceleration by sensing the speed of the motor as set by the command for the length extent and causing the time interval over which the length is to be produced to be set by the extent of the length. Accordingly, the motor velocity changes may be tailored to the motor operating characteristics even though only a one step maximum difference occurs between lengths to enable efficient utilization of the motor's ability. Thus, the present system enables the motor control system to receive just the command of the value of the extent of a length and to utilize this information for setting the velocity at which the length is to be produced to thus set the velocity change that occurs between the prior length and the present length even with the maximum difference between adjacent lengths being maintained constant.

Variations and modifications may be made within the scope of the claims and portions of the improvements may be used without others.

I claim:

1. In a motion control system for producing a movement consisting of a plurality of successive lengths with there being a command for each length that includes the extent of the length as defined by the number of steps therein, comprising means for receiving the command and producing essentially the number of motor pulses corresponding to the extent at a somewhat constant rate, said command containing information only relating to the extent of the length and digital motor means for receiving the motor pulses and producing a movement corresponding thereto, the improvement comprising non-linear velocity change means including pulse rate setting means for setting the rate of the motor pulses in a length and pulse rate controlling means connected to the pulse rate setting means for receiving information of the number of pulses in a length and setting the rate of the pulses in the length in accordance with the extent of the length.

2. The invention as defined in claim 1 in which the pulse rate controlling means sets the pulse rates to have a smaller rate of change for the larger extents than for the smaller extents.

3. The invention as defined in claim 1 in which the means for receiving commands receives commands in which the difference in extent between adjacent commands is limited to a maximum difference.

4. The invention as defined in claim 1 in which the non-linear velocity change means includes means for controlling the duration of the time interval in which the pulses are produced for a length in accordance with the extent of the length.

5. The invention as defined in claim 1 in which the pulse rate setting means includes an adjustable rate oscillator for producing oscillator pulses, in which the means for producing the number of motor pulses includes means for producing a motor pulse for a multiple number of oscillator pulses and in which the pulse rate controlling means is connected to adjust the rate of the oscillator.

6. The invention as defined in claim 5 in which the oscillator rate is voltage controlled, in which the extent of a length is represented by an electrical representation and in which the pulse rate controlling means converts the electrical representation to a voltage value applied to the oscillator.

7. The invention as defined in claim 6 in which the means for producing pulses includes a pulse rate generator for receiving the oscillator pulses to produce a plurality of different rates therefrom and an indication that the number of pulses in a length has been supplied.

8. The invention as defined in claim 6 in which the means for producing pulses includes a rate multiplier having a clock terminal to which the oscillator pulses are supplied and means for maintaining constant the value summed for each clock pulse in the rate multiplier.

* * * * *